Figure 1A:
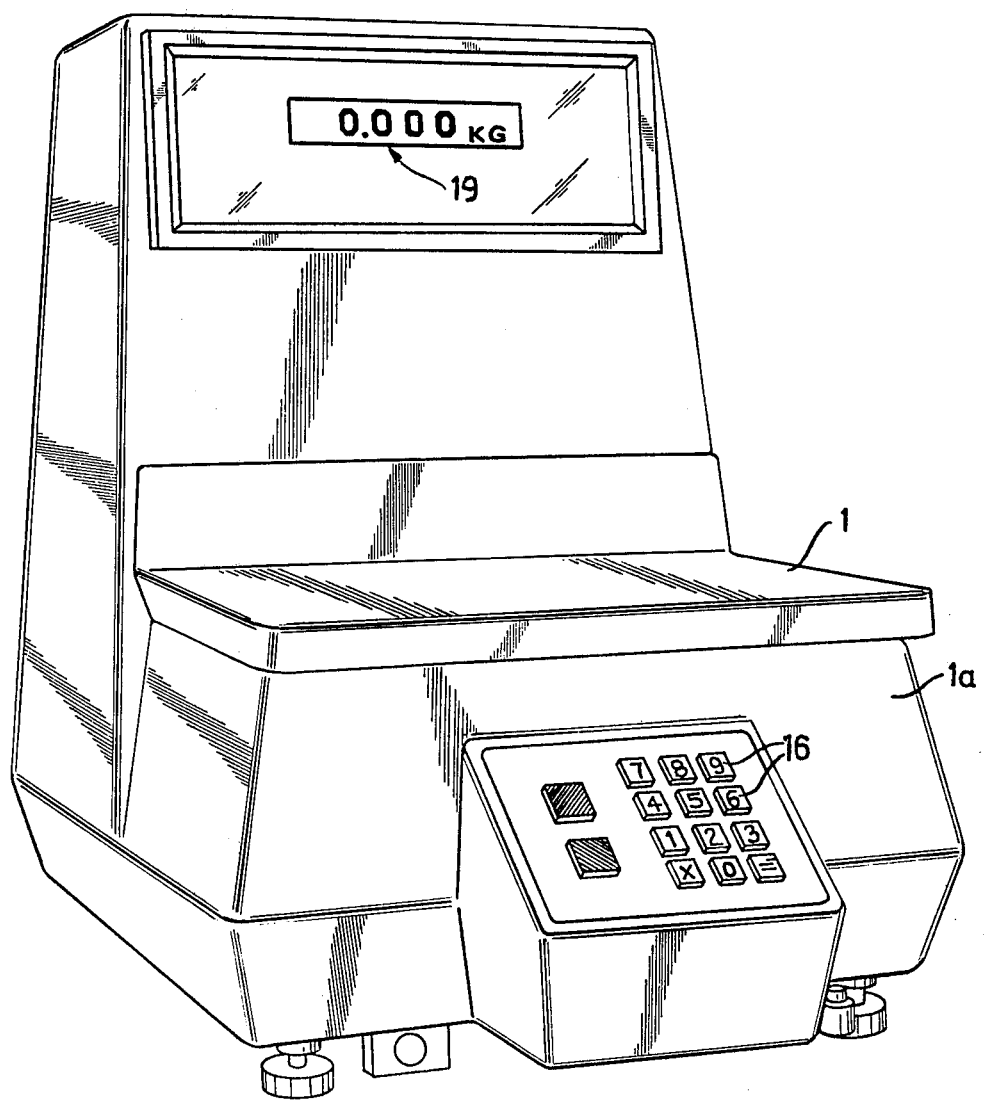

United States Patent [19]

Matilainen

[11] 4,044,846
[45] Aug. 30, 1977

[54] AUTOMATIC ZEROING OF SCALES WITH DIGITAL DISPLAY

[76] Inventor: Waltteri Matilainen, Hiirakkotie 3 E 86, 01200 Hakunila, Finland

[21] Appl. No.: 663,125

[22] Filed: Mar. 2, 1976

[30] Foreign Application Priority Data

Mar. 7, 1975 Finland .................................. 664/75

[51] Int. Cl.² ...................... G01G 13/14; G01G 3/14; G01G 19/40
[52] U.S. Cl. .............................. 177/165; 177/210 R; 177/DIG. 3; 235/151.33
[58] Field of Search ............ 177/165, 210 R, DIG. 3; 235/151.33

[56] References Cited

U.S. PATENT DOCUMENTS

| | | | |
|---|---|---|---|
| 3,375,357 | 3/1968 | Dekker et al. ................... | 177/165 X |
| 3,709,309 | 1/1973 | Williams, Jr. et al. .............. | 177/165 |
| 3,951,221 | 4/1976 | Rock .............................. | 177/DIG. 3 |
| 3,984,667 | 10/1976 | Loshbough ..................... | 177/DIG. 3 |
| 3,986,012 | 10/1976 | Loshbough et al. ............. | 177/165 X |

*Primary Examiner*—George H. Miller, Jr.
*Attorney, Agent, or Firm*—Hill, Gross, Simpson, Van Santen, Steadman, Chiara & Simpson

[57] ABSTRACT

A system for the automatic zero setting of scales having digital display of the weight is provided so that at tare weight of a bridge mechanism connected to a weighing pan of the scale the display will be as closely equal to zero as possible. Amplifiers and a voltage/frequency transducer are connected to the electrical measuring bridge. A presettable counter connects with the voltage/frequency transducer. The counter is preset so that at tare weight of the bridge mechanism the reading of the scale will be as close to zero as possible. In the path of the information going to the counter a correction unit is arranged. The count provided by the counter is observed by a differentiating unit for detecting deviations of a given magnitude in one direction or the other from a count value which produces a zero indication. The differentiating unit then supplies the correction order and direction of correction to the correction unit.

8 Claims, 6 Drawing Figures

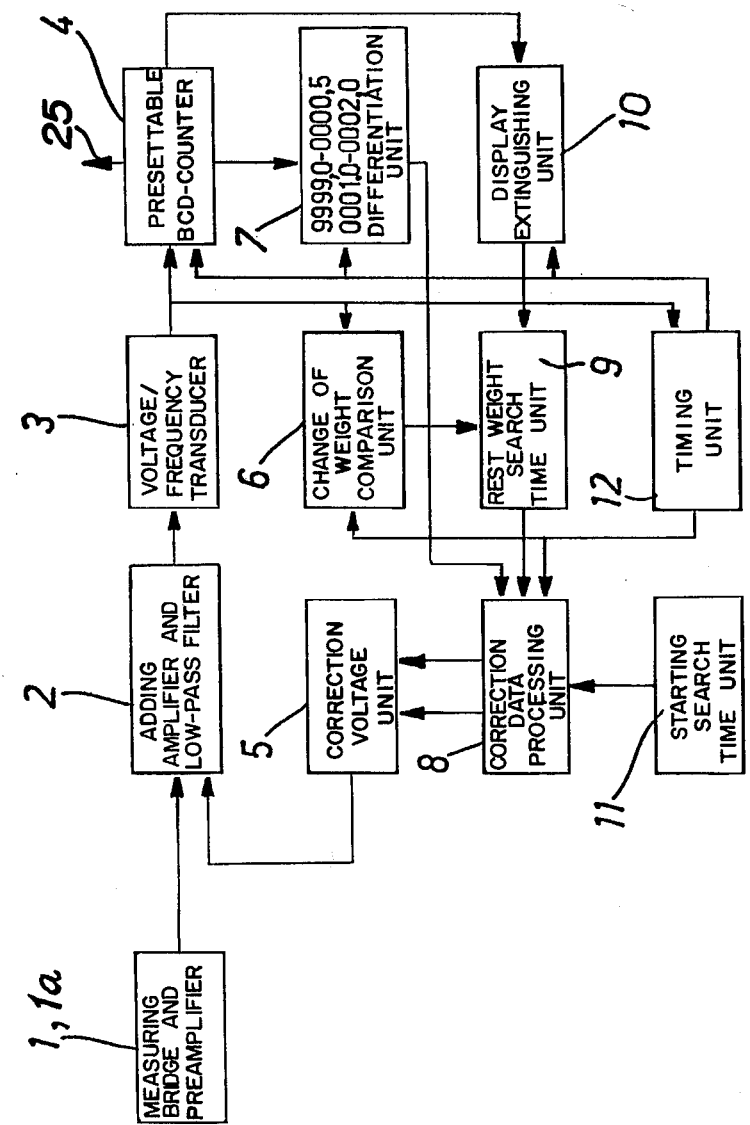

AUTOMATIC ZEROING OF SCALES WITH DIGITAL DISPLAY

The present invention concerns the automatic zero setting of scales provided with digital display, comprising an electrical measuring bridge, requisite amplifiers, a voltage/frequency transducer and a presettable counter, which has been preset so that at tare weight of the bridge mechanism the display of the scales will be as closely equal to zero as possible.

Automatic zeroing is particularly necessary in digital scales, where the weight is displayed by numerals. In that case even minor deviations from the reading 000,0 kg appear objectionable if the goods pan is empty.

Transient or permanent shift of the reading may be caused by a change in position of the scales (tilt), vibration, air currents, hysteresis especially after the weighing of a heavy object, weighing residue left on the plan, possible effect of temperature on the electronic components, and offset due to ageing of components in the course of prolonged periods (several years).

The object of the invention is to provide an automatic zero setting which eliminates all shifts of the reading due to the causes mentioned, so that with empty scales the reading will be 0,000 kg and that no error in the result of weighing is caused by the perturbing factors mentioned.

This aim is mainly achieved by virtue of the characteristics of the invention specified in the attached claims.

In the following the invention is more closely described with reference to the attached drawing, wherein:-

Figure 1B:
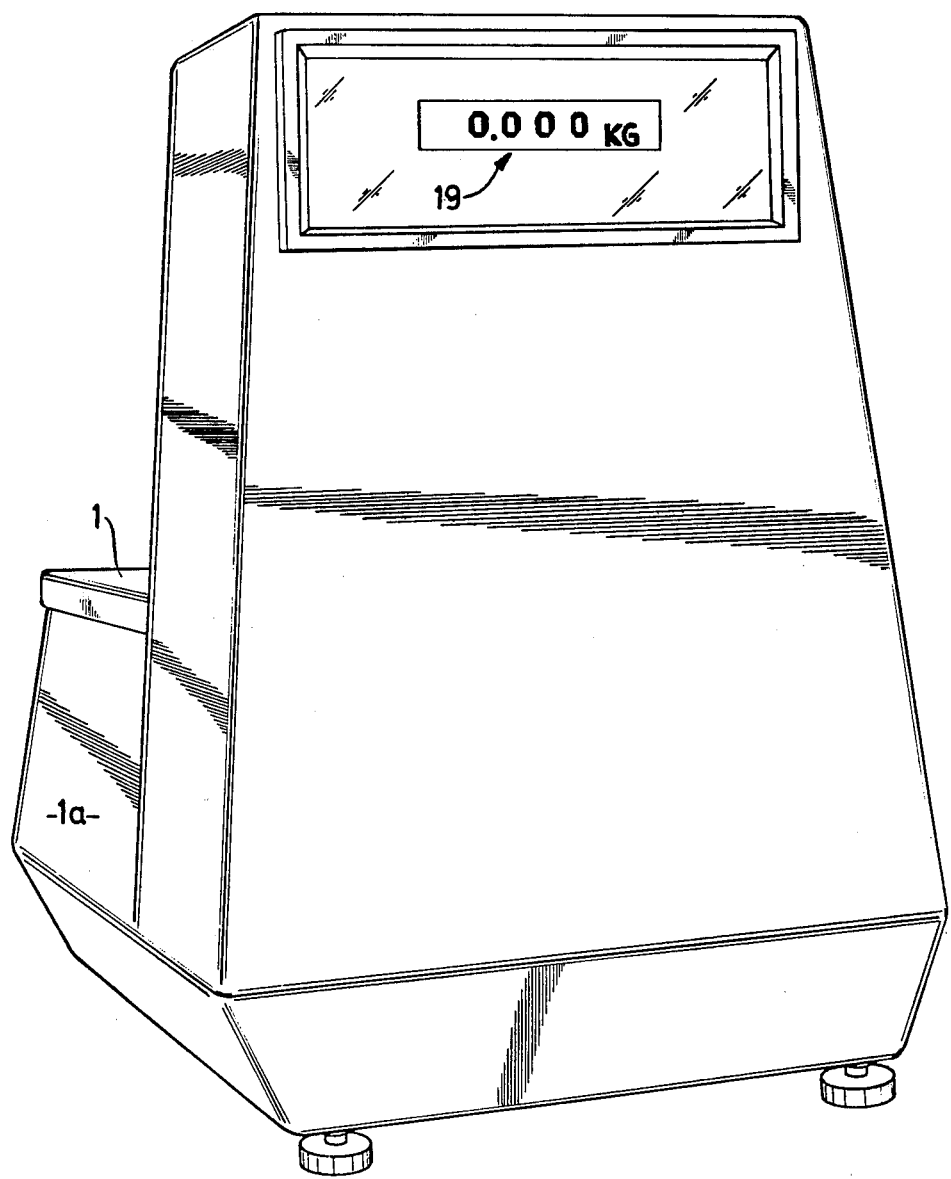

FIGS. 1a and 1b show, viewed from above and from two different directions, digital shop scales in which the automatic zeroing of the invention is needed.

Figure 3:
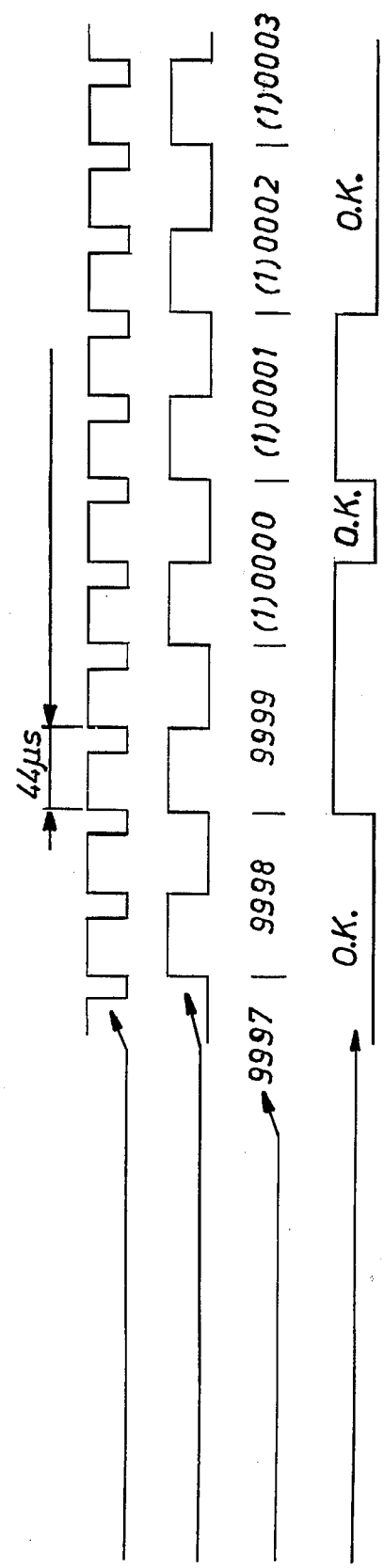

FIG. 2 presents the block diagram of the automatic zeroing according to the invention, and FIG. 3 shows certain voltage waveforms and data of the automatic zero setting system.

Figure 4:
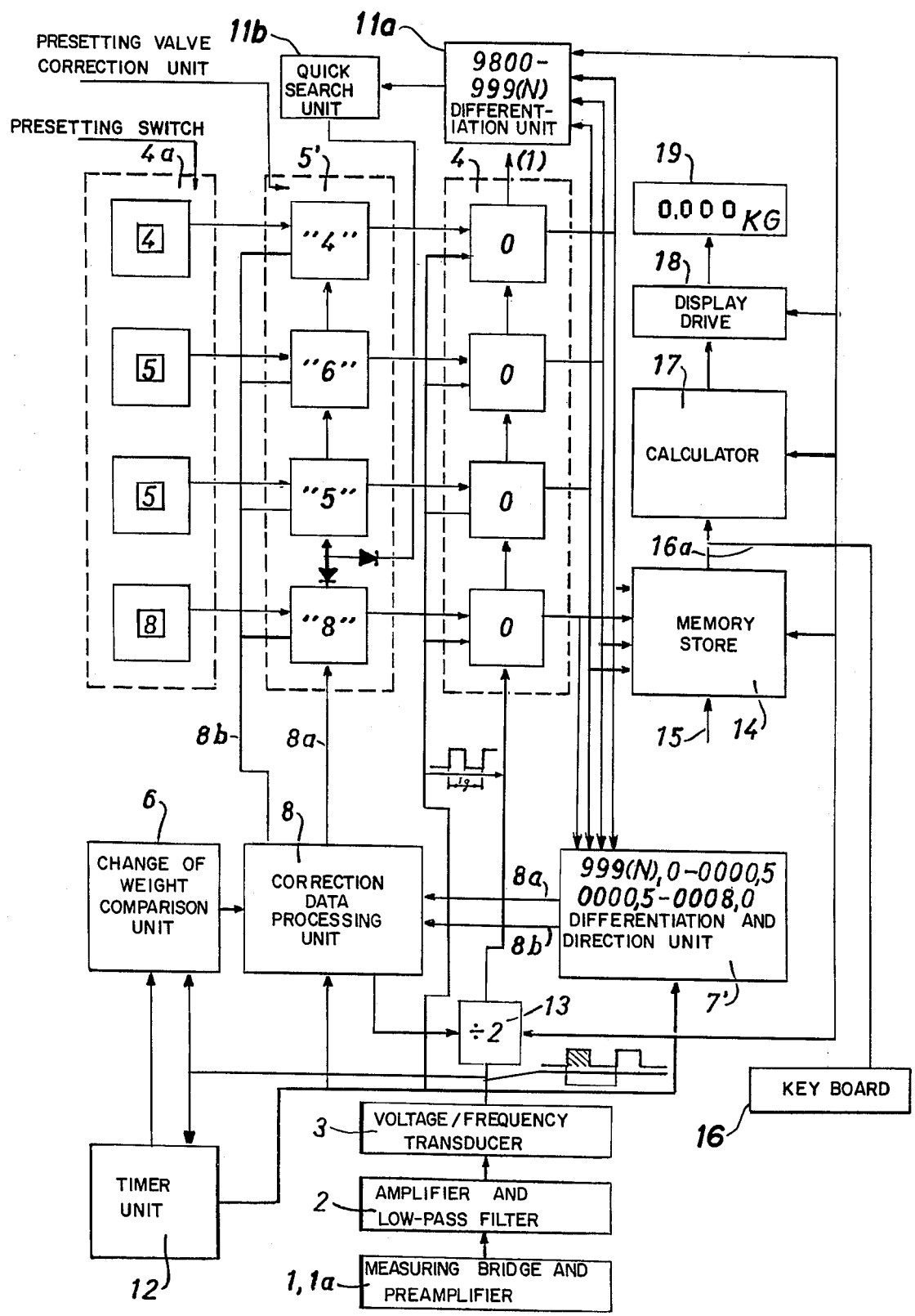
Figure 5:
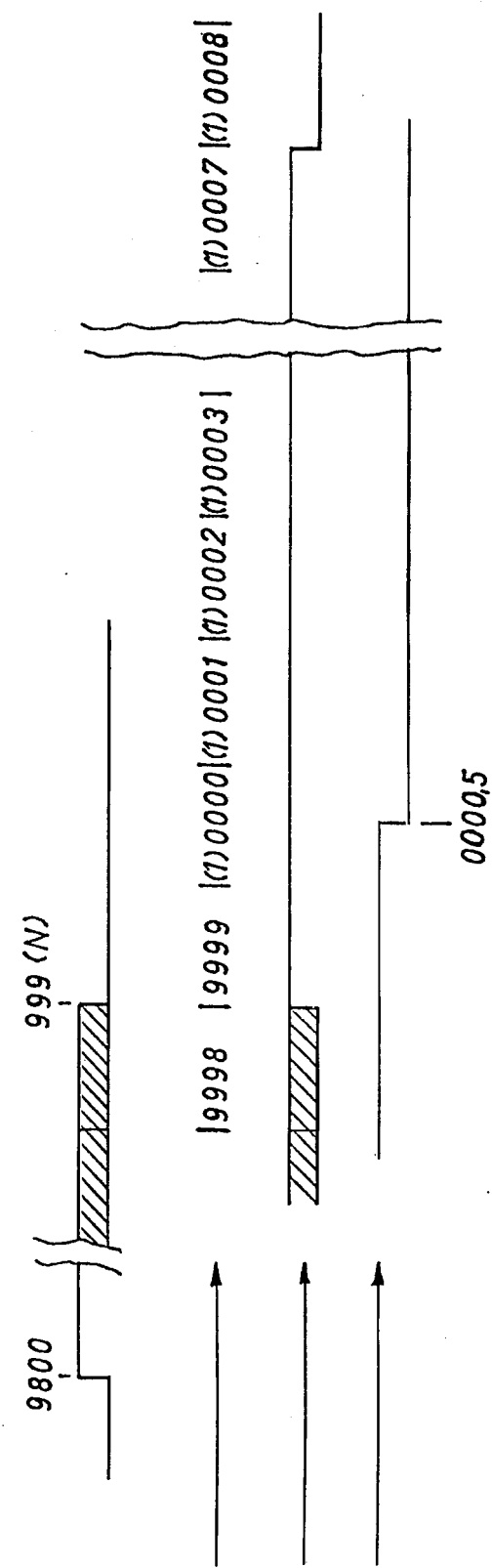

FIG. 4 presents the block diagram of another embodiment of the automatic zeroing of the invention, and FIG. 5 shows certain waveforms illustrating the embodiment of FIG. 4.

The block 1, 1a in FIGS. 2 and 4 represents the goods pan 1, visible in FIGS. 1a and 1b, and the measuring bridge and the weight datum preamplifier. The measuring bridge 1a may be, for instance, a strain gauge measuring bridge known in itself in prior art. The weight datum is conducted to the amplifier of block 2, and from the low-pass filter to the voltage/frequency transducer 3. From the voltage/frequency transducer 3 a pulsed voltage is obtained, which is shown topmost in FIG. 3. The number of weight pulses per unit time increases, that is the pulse sequence increases in density, with increasing weight and vice versa. In the exemplary case presented, one weight pulse corresponds to 0.5 g. This weight pulse sequence is conducted through a $\div 2$-dividing unit (only shown in FIG. 4, with reference numeral 13), the pulse sequence coming from the latter having a frequency smaller by one half, that is, in the exemplary case one pulse corresponds to 1 g. This sequence of weight pulses is conducted to the presettable BCD counter 4, and it has been represented in FIG. 3 under the legend "Measuring frequency to the BCD counter". The output of the voltage/frequency transducer has further been carried to the change of weight comparison unit 6 and to the timing of functions unit, 12. The BCD counter connects by line 25 to the memory store 14, calculator 17, display drive 18 and display 19 in FIG. 4.

The basis of the automatic zero setting is the tare weight of the bridge mechanism the value of which may be stored in the presettable BCD counter 4. If for instance the tare weight of the bridge mechanism is 5342 g, the presetting value 10000 g - 5342 g = 4658 g is entered in the BCD counter 4. If the goods pan is empty, the result of weighing, or the count value, will then be 4658 g + 5342 g = (1)0000 g, and because the output and display is with four digits only, the display 0,000 kg is obtained.

If display is desired e.g. with steps of 2 g, the consequence hereof would be that owing to the perturbation factors mentioned before the reading would continuously vary between 9.996 and 0.004 kg and over a more prolonged period the total deviations in one direction or the other would become even larger.

In order that this might be eliminated, the automatic zero setting described in the following has been provided in the invention. In the first embodiment, shown by FIGS. 2 and 3, there can be taken from the correction voltage unit 5 and added on the adding amplifier 2, for instance 64 correction voltage steps, each such step corresponding to about 0.5 g. The covering range of the zero setting would in this exemplary case be $\pm 16$ g. It is possible to increase this coverage if need exists. The correction voltage steps may be formed with the aid of parallel resistance circuits comprising e.g. eight steps consistent with 0.5 g each and eight steps of 4 g each (= $8 \times 0.5$ g). Hereby the said 64 (= $8 \times 8$) correction voltage steps are producible.

The correction voltage is governed by the following criteria.

1) When the scales are switched on, the starting search period 11 begins, which has a duration e.g. of 112 seconds, whereby the automatics find the weight counting result (1) 0.000 kg. This takes place in that the correction voltage 5 changes, starting at the lowest value (that is at the reading (1)0000 - 16 = 9984) and progressing upwardly in steps corresponding to 0.5 g, until the weight count reaches the value (1)0000. The period between correction steps equals 44 ms = measuring period. The sole limitation in this starting search procedure is that the goods pan shall be empty during the starting search period. Such a "warming up" time of two minutes, once a day when the scales are commissioned for use, is in no way an unreasonable requirement however.

2) When the count (1)0000 has been reached the zeroing automatics commence to operate on the basis of the information (=automatic zeroing data, in FIG. 2) supplied by the differentiating unit 7, as follows:

a. If the count of the measuring period is between 9999.0 and (1)0000.5, the correction data processing unit 8 supplies a correction order and the direction order "up" to the correction voltage unit 5.

b. If, again, the count is between (1)0001.0 and (1)0002.0, correspondingly a correction order with associated directional order "down" is obtained.

The power of resolution in the count is 0.5 g (one-half digit).

The comparatively long correction period, or interval between correction orders, (440 ms) and also the measuring period ensure that the perturbation movements of the empty goods pan (air current, vibrations etc.) cannot give correction orders on false grounds other than at most one order per direction, whereupon a correction in the opposite direction is already obtained (with result ±0).

It is thus understood that the automatics tend to keep the emptybridge count within (1)0000.5 to (1)0001.0. This interval has been chosen in order to obtain a 0.5 g distance from the count result (1)0000.0. This reading acts as display extinguishing limit, a result smaller than this putting the display out and any larger reading lighting the display. The distance of 0.5 g from the extinguishing reading guarantees that the display is not repeatedly extinguished as frequently as would be the case if the automatics were headed for the interval (1)0000.0 to (1)0000.5, for instance.

Since the reading is displayed with 2 g steps, the reading 0.0001 kg does not try to appear either.

In the exemplary case thus on the basis of the extreme values chosen or of the so-called "normal" criteria counts under 9999.0 are not corrected by the automatics; such counts could be the result of manual lifting of the pan for instance. The same is true for count results in excess of (1)0002.0, which already represent an actual weighing event. (Quite obviously results between (1)000.5 and (1)0001.0 are not corrected.)

3) When the pull from the change of weight comparison unit 6 (operating when the rate of change is in excess of 1.5 g/220 ms) and the display extinguishing datum unit 10 occur simultaneously, the residual weight search time unit 9 is started for a period e.g. of 6.5 seconds. This occurs in practice as a consequence of the "negative" overswing of the bridge mechanism following on removal of the goods.

During the rest weight search period unit 9 the correction voltage unit 5 has time to discount 14 instalments of residue, 0.5 g each, or altogether 7 g of residue, which may be either weighing residues or hysteresis especially after the weighing of a heavy piece of goods.

The rest weight search criterion (and similarly the starting search criterion) is overridden in the correction data processing unit by the so-called "normal" criterion when the range 9999.0 to (1)0002.0 is entered.

The rest weight search period is immediately interrupted if another weighing takes place beofre the end of the search time. The interruption is effected by a pulse from the change of weight comparison occurring alone, without display extinguishing datum. If the rest is more than 8 g in the exemplary case presented, the rest weight search will not start at all: the rest weight remains in display as a weighing result. This occurs only when a weighing residue is found which is so large and conspicuous that it should be removed.

The embodiment shown in FIGS. 4 and 5 shall be described next.

The manual presetting switch 4a of the BCD counter 4 is set to a value smaller than the presetting value calculated by the principle described above, e.g. to 4558. Between the presetting switch 4a and the presettable BCD counter 4 the presetting value correction unit 5' has been inserted, which may consist of a presettable BCD counter. The automatic zeroing process is based on continuous observation of the count given by the BCD counter 4 and on control, on its basis, of the presetting value correction unit 5' so that the presetting value is changed into one which yields the reading 0.000 kg.

Consistent with the setting 4558 of the presetting switch 4a the reading of the empty scales would be 9900 if such negative values would be displayed. The approach to the count (1)0000 from the value 9900 is by the quick search now to be described. The count of the BCD counter 4 (its three largest significant digits) is continuously observed by means of the differentiating unit 11a, which observes a count value between 9800 and 999(N). The symbol (N) refers to any number 0 to 9. When the scales are switched on, the count of the BCD counter 4 is within the said limits even in case as a result of various perturbation factors changes corresponding to ±100 g has taken place after the presetting of the switch 4a. When the differentiation unit 11a finds that the count of the BCD counter 4 is within its differentiation range, it controls with the aid of the quick search unit 11b the presetting value correction unit 5' so that in each measuring period determined by the timer 12 one correction pulse is obtained. In the exemplary case presented, one correction pulse of the quick search causes in the presetting value correction unit 5' augmentation of the presetting value by 10, which in this case corresponds to 10 g. When the presetting value has increased so much that from the BCD counter 4 the count 999(N) is obtained, the limit of the differentiation unit 11a is reached and the quick search stops. At the same time the zero search proper starts, which is described in the following.

The count of the BCD counter 4 is watched with the differentiating unit 7', where in this exemplary case the differentiation ranges 999(N).0 to 0000.5 and 0000.5 to 0008.0 have been selected. The differentiating unit 7' may at the same time also observe the direction, that is the side of the value 0000.5 on which the count lies. Thus after the quick search has stopped the differentiation unit 7' supplies over the correction data processing unit 8 to the presetting value correction unit 5', correction pulses, and the direction of correction "up" is still in operation without interruption. The path of the correction pulses has been indicated by the arrow 8a and the path of the direction of correction, by reference numeral 8b. Correction pulses are only given at every second measuring period determined by the timer 12. The correction data processing unit 8 controls a divider unit 13 so that in the measuring period in which a correction pulse occurs the passage through the divider unit 13 of the first weight pulse arriving from the voltage/frequency transducer 3 is prevented. On every second measuring period, when no correction pulses occur, the said first weight pulse is allowed to pass. In this manner a correction can be formed which progresses by steps of 0.5 units of measurement, e.g. of 0.5 g. This enables the corrective actions to be carried out with the same accuracy as the differentiating accuracy. The differentiating accuracy of 0.5 units of measurement, again, is based on the fact that the pulse corresponding to one unit of measurement is in a different state about 50% of its duration. It is thus understood that the corrections take place as if they were made in steps corresponding to 0.5 g even though the presetting value is augmented by steps consistent with 1 g. Finally the count reaches the value 0000.5 and remains in oscillation on either side thereof. The direction of correction is alternatingly reversed to "up" and "down". It would be possible, alternatively, to provide in the differentiating unit 7' a range such that at a count within this range no corrective action occurs. But this is not necessary because corrections occurring within the interval 0000.0 to 0001.5 are not visible in the display 19.

It is possible to select the upper limit of the differentiating unit 7' in accordance with the least weight one desires to be able to weigh. In shop scales for instance in practice no need is encountered to determine any weight smaller than 10 g, for which reason in this exemplary case the upper limit of differentiation has been chosen at 0008.0. Hence follows that if the count of the scales deviates upwardly from the value producing zero reading as a consequence of the above-mentioned perturbing factors, in particular of weighing residues, the differentiating unit 7' gives over the correction data processing unit 8 to the presetting value correction unit 5', correction pulses and the direction of correction "down". In this case, too, correction pulses are given in every second measuring period only. During those measuring periods in which no correction pulses occur, the passage through the dividing unit 13 of the first weight pulse in the period to arrive at the dividing unit 13 is prevented, whereby in the measuring period in question a "down" correction of 0.5 measuring units is obtained even though the presetting value is not corrected. When in the next measuring period the passage of the first pulse is not blocked, a "down" correction of only 0.5 measuring units with reference to the preceding is obtained although the presetting value is corrected one measuring unit "down". After the correction the count remains vacillating on either side of the value (1)0000.5 in steps of 0.5.

In order that no unnecessary correction activity might occur in connection with the usual weighing process, the change of weight comparison unit 6 has been arranged to control the correction data processing unit 8 so that in the event of a rate exceeding a given change of weight rate no correction takes place. In normal shop scales for instance 1.5 g/220 milliseconds is a suitable lower limit of the rate of change.

The count of the presettable BCD counter 4 goes to the memory 14, thence to the calculator 17 and through the display drive 18 to the display 19. If by the keyboard 16 price data are entered at 16a to the calculator 17, the control line 15 is used to prevent the egress of the weight datum from the memory 14, until the output order is given which releases the weight datum from the memory 14 to go to the calculator 17, where the product of unit price and weight is formed, and the final price is made to appear in the display. However, these operations are no part of the automatic zero setting of the present invention, which is applicable to all and any types of scales with digital display.

The automatic zero correction according to the present invention has the character of tare adjustment, that is the weight consistent with the amount of the correction is also subtracted from or added to the full weight. Thus the offset error is completely cancelled. The amplification error is also corrected by the tare/gross ratio. The circuitry of the measuring bridge and preamplifier 1a, the amplifier and low-pass filter 2, and the voltage/frequency transducer 3 are well known to those skilled in this art and can be purchased as commercially available units. The same is true of the presettable BCD-counter 4, memory store 14, calculator 17, display drive 18, display 19, and timer 12. The logic circuitry for the weight comparison change unit 6, differentiating unit 7, correction voltage unit 5, rest weight search time unit 9, correction data processing unit 8, and the other logic circuits can easily be constructed by those skilled in the art based on the recited functions for such blocks.

It is claimed:

1. A system for the automatic zero setting of scales with digital display after a normal weighing process comprising: a goods pan having measuring voltage means connected through a preamplifier to an adding amplifier unit having a low-pass filter; said amplifier unit with the low-pass filter being connected to a frequency and voltage transducer unit which is connected to a presettable BCD-counter and to a change of weight comparison means; said presettable BCD-counter being connected to a memory store which is connected to a calculator; the calculator being connected through a display drive to a display; a timer unit being connected to said BCD-counter, to said change of weight comparison means, to said memory store, to said calculator, and to said display drive; said BCD-counter being connected to a differentiating means for detecting deviations of a count value of the BCD-counter within given limits in one direction or the other from a count value producing zero indication, the differentiating means supplying a correction order and direction of correction to a correction data processing unit which is connected to a correction voltage means; said correction voltage means being connected between the BCD-counter and said measuring voltage means for causing a correction of the count value until it produces the count value corresponding to zero indication of weight; said change of weight comparison means being connected to said correction data processing unit for preventing correction during the normal weighing process when rate of weight change exceeds a given magnitude; said differentiating means and correction data processing unit also being connected to said timer unit.

2. A system for the automatic zero setting of scales according to claim 1 characterized in that the differentiation range of said differentiating means is from 9990 to 0008.0.

3. A system for the automatic zero setting of scales according to claim 1 characterized by another differentiating means having a large differentiation range outside the differentiation range of said differentiating means, said other differentiating means being connected to a quick search means for giving correction pulses to said correction means for approach towards the count value giving zero indication in steps larger than steps of said differentiating means until the differentiation range of said differentiating means is entered.

4. A system for the automatic zero setting of scales according to claim 1 characterized in that said correction means is a presettable value correction unit which is connected between a presettable switch of the BCD-counter and said BCD-counter and that the differentiating means detecting the deviations of the count value given by the BCD-counter supplies correction pulses and direction of correction information to said presettable value correction unit.

5. A system for the automatic zero setting of scales according to claim 4, characterized in that said presettable value correction unit is a presettable BCD-counter.

6. A system for the automatic zero setting of scales according to claim 4 characterized by a ÷ 2 - dividing unit connected between said frequency and voltage transducer unit and said BCD-counter, said correction data processing unit being connected to said ÷ 2 - dividing unit.

7. A system for the automatic zero setting of scales according to claim 4, characterized in that the differentiating means supplies correction pulses only in every second measuring period, the correction data processing unit controlling a ÷ 2 - dividing unit which is placed in the path of weight pulses so that when a correction pulse occurs and the direction is "up" the passage through the ÷ 2 - dividing unit of the first weight pulse arriving at the ÷ 2 - dividing unit is prevented, and when the direction is "down" the corresponding blocking of the weight pulse is performed in every second measuring period in which no correction pulses occur.

8. A system for the automatic zero setting of scales according to claim 7 characterized in that the correction pulses and the weight pulses arriving at the BCD-counter are of equal value.

* * * * *